US005691753A

United States Patent [19]

Hilton

[11] Patent Number: 5,691,753

[45] Date of Patent: Nov. 25, 1997

[54] VALVING CONNECTOR AND INK HANDLING SYSTEM FOR THERMAL INK-JET PRINTBAR

[75] Inventor: Brian S. Hilton, Webster, N.Y.

[73] Assignee: Xerox Corporation, Stamford, Conn.

[21] Appl. No.: 598,625

[22] Filed: Feb. 12, 1996

Related U.S. Application Data

[63] Continuation of Ser. No. 213,282, Mar. 15, 1994, abandoned.

[51] Int. Cl.[6] .......................... B41J 2/175; F16K 31/12; E03B 00/00

[52] U.S. Cl. .......................... 347/85; 137/496; 137/907

[58] Field of Search .......................... 347/85, 86, 89, 347/84, 87; 137/907, 496

[56] References Cited

U.S. PATENT DOCUMENTS

| | | | |
|---|---|---|---|
| 3,891,121 | 6/1975 | Stoneburger . | |
| 4,240,082 | 12/1980 | Yu | 347/85 |
| 4,506,276 | 3/1985 | Kyser | 347/86 |
| 4,597,682 | 7/1986 | Rooney . | |
| 4,829,324 | 5/1989 | Drake . | |
| 4,833,491 | 5/1989 | Rezanka | 347/43 |
| 5,126,752 | 6/1992 | Weinberg . | |
| 5,359,356 | 10/1994 | Ecklund | 37/86 |

FOREIGN PATENT DOCUMENTS

| | | | |
|---|---|---|---|
| 0 478 244 | 4/1992 | European Pat. Off. . | |
| 62-116152 | 5/1987 | Japan | 347/85 |
| 62-161544 | 7/1987 | Japan | 347/86 |
| 4-187449 | 7/1992 | Japan | 347/85 |

*Primary Examiner*—Benjamin R. Fuller
*Assistant Examiner*—Judy Nguyen
*Attorney, Agent, or Firm*—Oliff & Berridge

[57] ABSTRACT

A valving connector used in a thermal ink-jet printer for filling and draining ink from a manifold of the printbar. The valving connector has two positions depending on the operation of the printer. In the first position, the top portion of the manifold is filled with air, and the bottom portion of the manifold is connected to a vacuum. The ink is drained from the manifold until empty, then the printbar can be removed and replaced. In the second position, the top portion of a manifold is connected to the vacuum and the bottom portion of the manifold is connected to the ink supply. In this second position, the manifold is supplied with ink during printing operations. An ink handling system with such a valving connector delivers ink to the printbar on demand. The ink handling system has a replaceable ink supply and a diaphragm valve to regulate the flow of ink to the manifold. A needle assembly extracts ink from the ink supply and delivers the ink to the diaphragm valve. The needle assembly has a needle with a side inlet. An RTV valve slides over the needle inlet when replacing the ink container. Ink flow is initiated and maintained by the ink jet capillary forces, atmospheric pressure and gravity. The system is duplicated for each color of a multi-color printing device.

15 Claims, 5 Drawing Sheets

VALVING CONNECTOR AND INK HANDLING SYSTEM FOR THERMAL INK-JET PRINTBAR

This is a continuation of application Ser. No. 08/213,282 filed Mar. 15 1994, now abandoned.

BACKGROUND OF THE INVENTION

1. Field of the Invention

This invention relates to improvements in the insertion and removal of a thermal pagewidth printbar in a thermal ink-jet printer. More particularly, this invention uses a valving connector and an ink handling system that allows the thermal pagewidth printbar to be removed without spilling ink.

2. Description of the Related Art

Thermal ink-jet printers have a plurality of thermal heads for ejecting ink onto a recording medium, for example, paper. Each thermal head has a resistor to selectively vaporize ink near the nozzle of the capillary filled ink channels. The vaporized ink forms a bubble that temporarily expels an ink droplet and propels it toward the paper. These types of thermal heads are incorporated in either a carriage-type printer or a pagewidth type printer.

The pagewidth printer includes a stationary printbar with a length equal to or greater than the width of the paper. The paper is continuously moved past the pagewidth printbar at a constant speed or in a step manner during the printing process. Refer to U.S. Pat. No. 4,463,359 to Ayata et al., the disclosure of which is incorporated herein by reference, for an example of a pagewidth printhead. The paper is supported on the platen and located adjacent to the printbar so as to maintain a precise distance away from the thermal printhead nozzles. These platens either supply the motive force to the paper to convey the sheets passed the printbar, or merely act as a support.

The ink-jet printheads usually require maintenance in order to, for example: clear clogged nozzles; remove air from the printhead (air particularly interferes with droplet formation in thermal ink-jet printers); clean dirt and excess ink from the nozzle containing surface of the printhead; cap the printhead nozzles during periods of non-use in order to prevent drying of the ink in the nozzles; and prime the printhead nozzles (individually or all at once during printer startup).

It is difficult to integrate maintenance stations with pagewidth printbar architectures, because the printbar extends entirely across a sheet. When replacing the printbar, the technician must be careful to disconnect the supply of ink to the printbar before removing it. Also, the technician must be careful to avoid spilling the ink remaining in the printbar.

SUMMARY OF THE INVENTION

It is an object of the present invention to provide an ink-jet printer that has a thermal pagewidth printbar that can be removed and replaced without ink being stored therein.

It is another object of the invention to provide a system to supply ink to the pagewidth printbar. The system must supply ink and remove ink from the printbar when necessary.

To achieve the foregoing and other objects of the invention, and to overcome the shortcomings discussed above in the prior art, a pagewidth printbar for an inkjet printer uses a valving connector to connect the thermal pagewidth printbar to the ink handling system.

The ink handling system delivers degassed ink to the printbar on demand. The ink handling system has a replaceable ink supply and a diaphragm valve to regulate the flow of ink to the thermal pagewidth printbar. The ink is removed from the ink supply by using a needle assembly that has a RTV valve and a needle. As the ink is used by the ink jets of the printbar, a negative pressure is formed in the diaphragm valve which draws ink from the ink supply and delivers it to the printbar to replenish the supply of ink used by the ink jets.

The needle assembly has a fixed hollow needle encased in a plastic column. The needle has a side inlet to extract ink from the ink container. A molded RTV valve that slides over the needle is located in the plastic column. A spring maintains the RTV valve over the needle inlet when the ink container is replaced.

The invention uses a valving connector between the printbar manifold and the ink handling system. The valving connector permits the draining of the ink in the manifold and maintains the ink in the rest of the ink handling system. Check valves could be installed to prevent ink leakage from the manifold; however, draining the ink is more desirable due to the space constraints and difficulty of incorporating manifold valves.

The valving connector has two openings connected to the manifold of the printbar and three openings connected to the ink handling system. The manifold holds the ink at a specific level that is above the capillary tubes of the ink jets. The manifold has a top and a bottom opening connected to the valving connector. The ink handling system supplies air, ink and a vacuum to the three remaining openings of the valving connector.

The valving connector contains tubes that connect the three inlets for ink, vacuum and air to the two manifold connections. Once the pagewidth printbar is connected to the valving connector via the manifold, the handle of the valving connector is moved to a first position. Ink is supplied to the bottom opening of the manifold and the vacuum is applied to the top opening of the manifold. Air above the rising ink level is evacuated until the ink is at a predetermined operating level. This allows the manifold to fill with ink without forming air bubbles.

When the pagewidth printbar is to be removed from the printer, the handle is moved to a second position. The bottom opening of the manifold is connected to the vacuum and the top opening of the manifold is connected to the air supply. The ink remaining in the manifold is vacuumed out and replaced by the air forced into the manifold. This eliminates the possibility of forming air in the ink lines.

BRIEF DESCRIPTION OF THE DRAWINGS

For a better understanding of the invention and further features thereof, reference is made to the following detailed description of the invention to be read in connection with the accompanying drawings, wherein.

DETAILED DESCRIPTION OF THE PREFERRED EMBODIMENTS

While this invention is described in some detail herein, with specific reference to illustrative embodiments, it should be understood that there is no intent to be limited to that embodiment. On the contrary, the aim is to cover all embodiments, alternatives and equivalents falling within the spirit and scope of the invention as defined by the claims.

Figure 1:
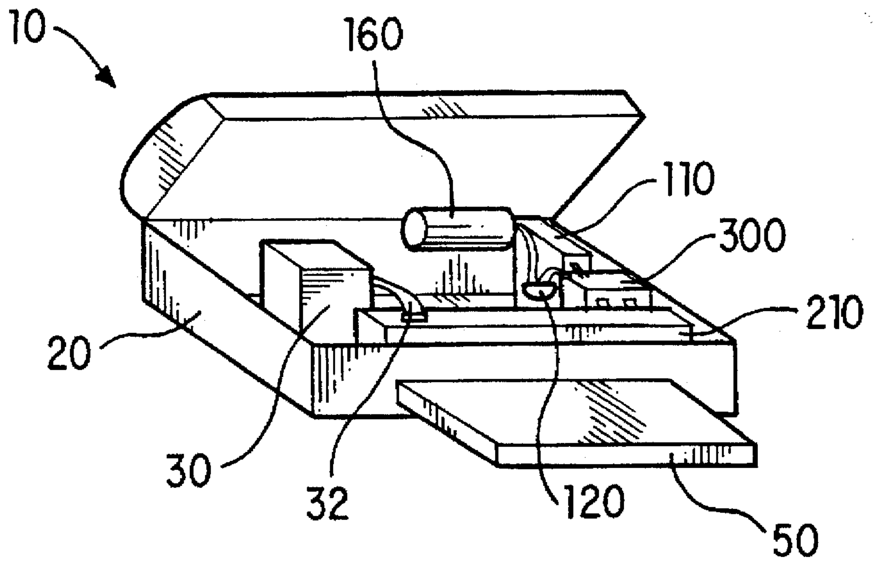
FIG. 1 is a representation of a thermal ink-jet printer containing the invention.

Referring to FIG. 1, a thermal ink-jet printer 10 is illustrated. Paper is loaded into paper tray 50, which is inserted into a printer case 20. Paper is moved past thermal pagewidth printbar 210, which jets ink onto the paper in response to signals from the controller 30 via ribbon connector 32.

Ink is stored in ink bag 160, which is located above (at a higher level than) the position of the pagewidth printbar. Diaphragm valve 120 controls the amount of ink flowing from the ink bag 160 to the valving connector 300. Vacuum pump 110 is connected directly to valving connector 300. Ink is added and removed from pagewidth printbar 210 using the valving connector 300, which will be described in detail below.

Figure 2:
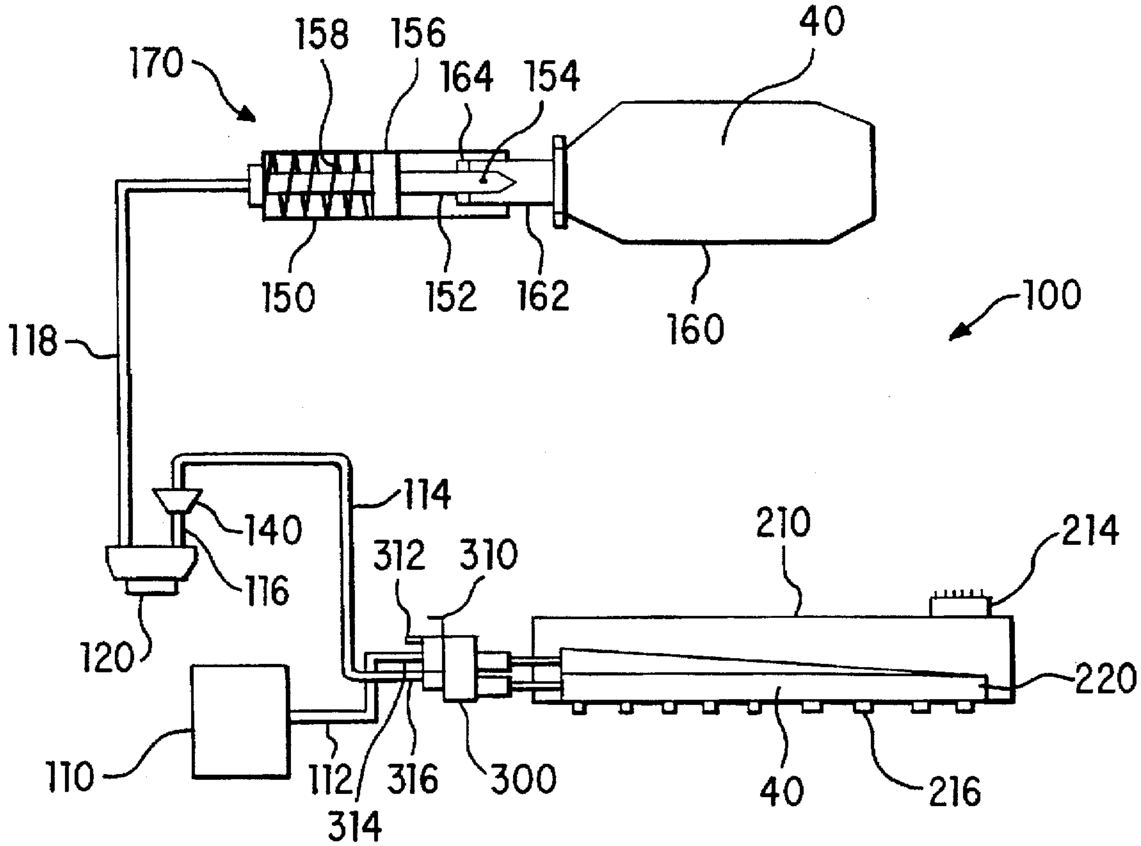
FIG. 2 is a detailed diagram of the ink handling system of the invention.

FIG. 2 shows an ink handling system 100 of the invention for a thermal ink-jet printer. The ink handling system delivers ink to the pagewidth printbar 210 on demand. It includes a customer replaceable ink supply, and a spillage drain for the printbar manifold to aid a technician when replacing the printbar. Ink flow is initiated and maintained by the ink-jet capillary forces, atmospheric pressure, and gravity. The system is duplicated for each color of a multicolor printing device.

The ink bag 160 contains ink 40. The ink 40 may be degassed. It is preferable that the pagewidth printbar 210 receives ink that has not been exposed to the atmosphere. Therefore, the ink bag 160 is collapsible and has low permeability to both moisture and air. The ink bag 160 maintains flexibility to collapse with a low pressure difference between the external atmospheric pressure and the internal ink pressure. For example, a foil laminate bag satisfies this criteria.

The ink bag 160 has a dispensing cap 162, which is heat sealed into the bag. The dispensing cap 162 contains a soft rubber septum 164, which provides an airtight seal that can be punctured with a needle 152 for easy ink removal. The septum 164 reseals itself after the needle 152 is removed to prevent the ink from spilling from the ink bag 160. The septum 164 can have a teflon layer (not shown) for low permeability to control the ink level.

The needle assembly 170 has a fixed needle 152 encased in a plastic column 150. The hollow needle 152 is sized for minimal pressure drop and has a side needle inlet 154. The combination of a side needle inlet 154 and a rounded tip prevents coring of the soft rubber septum 164, which is part of the ink bag 160. An RTV valve 156 has a molded inner diameter optimized for minimum friction on the needle. A spring 158 positions the RTV valve 156 to cover the needle inlet 154 when the ink bag 160 is removed and/or replaced.

Figure 3A:
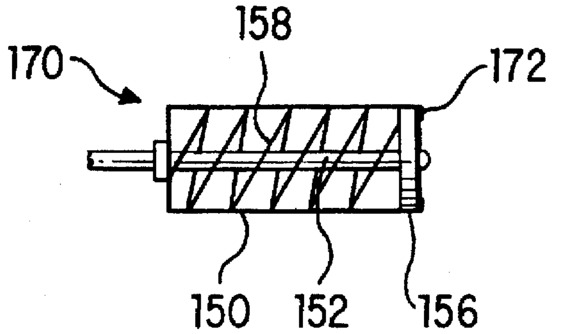
FIG. 3A is a detailed diagram of the needle assembly in a closed position.

Referring to FIG. 3A, the needle assembly 170 in the closed position is shown. The RTV valve 156 completely covers the needle inlet 154. In this position, the needle inlet is sealed to avoid exposing the ink to the atmosphere. The pressure applied by spring 158 maintains the position of the RTV valve 156 against the flange 172.

Figure 3B:
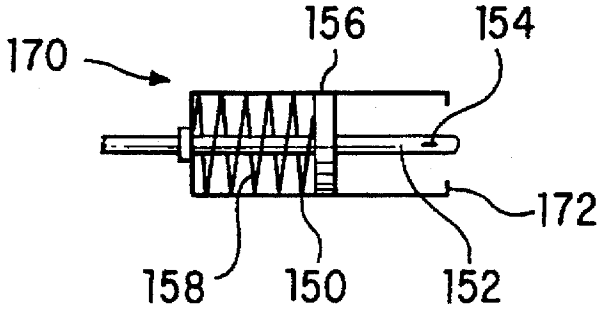
FIG. 3B is a detailed diagram of the needle assembly in an open position.

When attaching an ink bag 160, the needle assembly moves to the open position shown in FIG. 3B. The soft rubber septum of the ink bag (not shown) tightly seals against the RTV valve 156. The needle inlet 154 remains sealed until inside the ink container 160. This provides an airtight seal for the ink supplied to the manifold of the printbar. The pressure of inserting the ink bag against the RTV valve forces the compression of the spring 158 and movement of the RTV valve down the shaft of the needle 152. After the ink container is in position, ink can be removed from the ink bag 160 via the exposed needle inlet 154.

The ink bag 160 is located at a higher elevation than the pagewidth printbar 210 so that the ink flows toward the ink-jet printbar 210 via gravity. However, the printbar will weep unless it has a slightly negative pressure at the printhead. Therefore, ink line 118 is attached between RTV valve 156 and a diaphragm valve 120, which regulates the ink supplied to the manifold based on the pressure in the printbar.

The diaphragm valve 120 provides a shut-off for the ink handling system and provides the necessary negative pressure when the printbar is not in use. During printing, negative pressure produced by the firing jets creates a pressure differential across the diaphragm actuating the valve to initiate the flow of ink.

Figure 4:
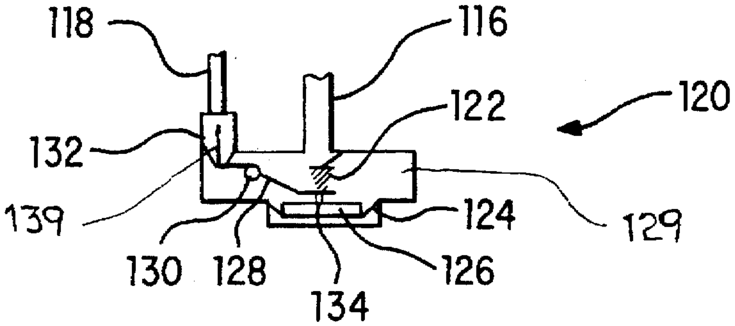
FIG. 4 is a detailed diagram of the diaphragm valve used in the ink handling system.

FIG. 4 shows a detailed diagram of the diaphragm valve. Ink line 118 is attached to entrance fitting 132 of the diaphragm valve 120. The entrance fitting 132 contains a needle 139 that seals against the opening of the entrance fitting located inside of the entrance fitting 132. Metering lever 128 is connected to the fulcrum 130. The first end of the metering lever 128 is attached to the needle 139 to pull down the needle to release the ink flow from ink line 118. The second end of the metering lever 128 is between a metering spring 122 and a button 134. The metering plate 126, which is in contact with the diaphragm 124, is connected to the button 134. Ink flows from the diaphragm valve 120 via ink line 116.

As the ink flows out of ink line 116 to fill the manifold of the printbar, the pressure in the cavity 129 of the diaphragm valve 120 decreases. Therefore, the metering plate 126 moves upward due to the contraction of the diaphragm 124. As the diaphragm contracts, the button 134 pushes the metering lever 128 in an upwards direction. This pulls the needle 139 downward to allow ink to flow through the ink line 118 into the cavity of the diaphragm valve 120.

Referring back to FIG. 2, the description of the ink handling system will be continued. Ink flows from the diaphragm valve 120 through ink line 116 toward filter 140. The filter is sized for low impedance and for preventing particles above 10 μm in size from entering the printbar manifold.

The filtered ink flows through ink line 114 toward the valving connector 300, which will be described in detail below. The valving connector 300 provides a shut off for the ink handling system during printbar installation or removal. The valving connector 300 has three inlet lines: air connector 312; vacuum connector 314; and ink connector 316. A vacuum pump 110 creates a vacuum in vacuum line 112 which is connected to the vacuum connector 314. The vacuum allows the ink to be purged from the printbar manifold before printbar removal. The valving connector 300 is connected directly to the printbar manifold 220. Controller connector 214 receives signals from the controller (not shown) to control the firing of the ink jets 216. In the printbar manifold 220, the level of the ink 40 remains constant during normal printing operations.

Figure 5:
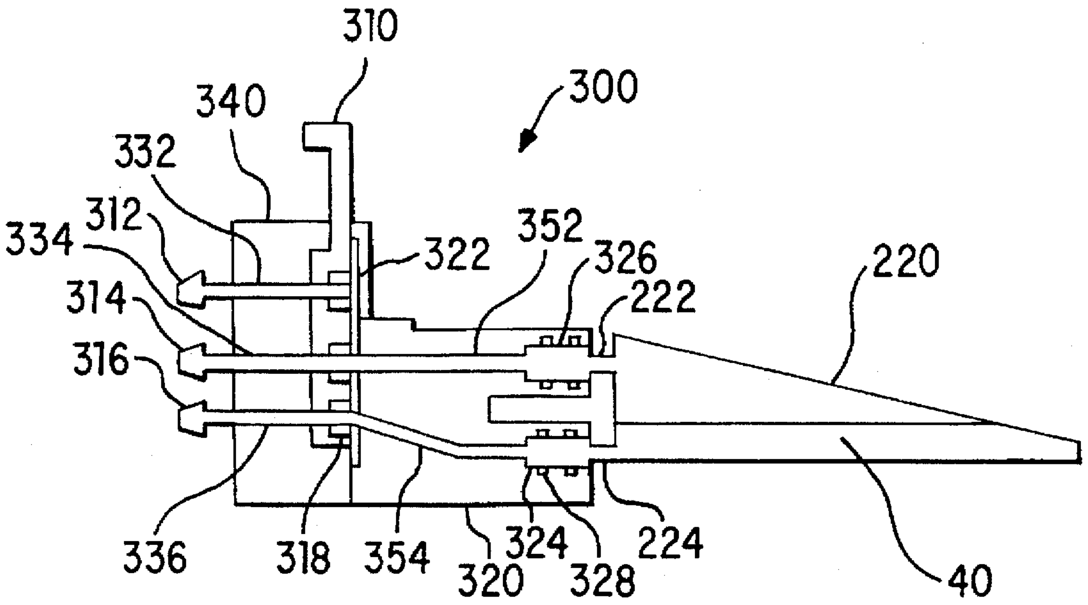
FIG. 5 is a detailed diagram of a first embodiment of a valving connector in a first position.
Figure 6:
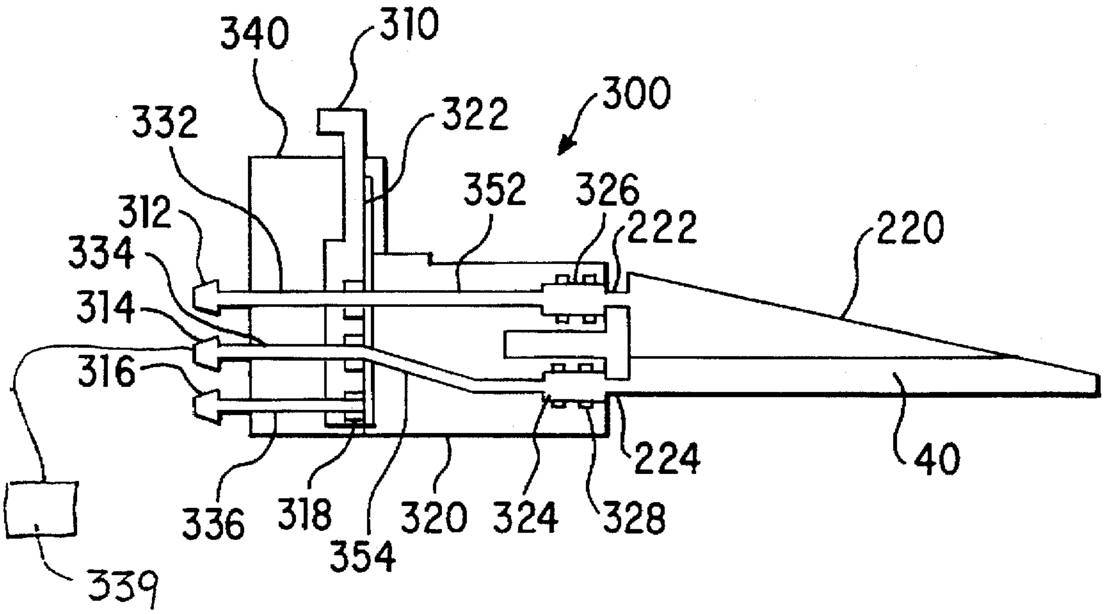
FIG. 6 is a detailed diagram of the first embodiment of a valving connector in a second position.

The valving connector 300 of the invention provides easy removal and replacement of the printbar by a technician. A first embodiment of a valving connector 300 is shown in FIG. 5. The valving connector 300 is designed to mate with the pagewidth printbar manifold 220 and switch the manifold inlet between a state of steady ink supply as shown in FIG. 5 to a state of draining the manifold as shown in FIG. 6. This allows the manifold to be purged without disturbing ink in the rest of the system.

Referring to FIG. 5, handle 310 and base 320 are connected together using bracket 340. Screws (not shown) are inserted into the bracket 340 to compress the O-rings 318 for a tight seal. The bracket also limits the movement of the handle 310 during positioning.

Top printbar manifold line 222 is connected directly into top output connector 326 of the valving connector 300. Bottom printbar manifold line 224 is connected directly into bottom output connector 324 of the valving connector 300. O-rings 328 wrap around the top output connector 326 to tightly seal the connection to the printbar manifold line 222. O-rings 328 also wrap around the bottom output connector 324 to similarly seal the connection to the bottom printbar manifold line 224.

Air connector 312 can be open to the surrounding air or connected to an airline (not shown) to provide pressured or filtered air. Vacuum connector 314 is connected directly to a vacuum line as shown in FIG. 2. Ink connector 316 is connected directly to ink line 114, which is also shown in FIG. 2.

Valving connector air line 332 is connected to air connector 312. Vacuum connector 314 is connected to valving connector vacuum line 334. Ink connector 316 is connected to valving connector ink line 336. O-rings 318 seal the connections of the air line 332, vacuum line 334, and ink line 336 to provide tight connections to teflon plate 322. The teflon plate 322 is inserted to control the opening of the connecting lines within the valving connector 300. The teflon plate 322 also decreases friction, and therefore lowers the necessary valving forces needed. The top manifold connector line 352 is connected to top output connector 326 and bottom manifold connector line 354 is connected to bottom output connector 324.

The general operation of the ink handling system and the valving connector 300 will now be described. When the handle 310 is in the up position, as shown in FIG. 5, the vacuum is connected to the top printbar manifold line 222 and the ink line is connected to the bottom printbar manifold line 224. The vacuum is activated to create a lower pressure in the top portion of the manifold 220. When the lower pressure in the manifold 220 exists, the ink pressure decreases and causes the diaphragm valve 120 (FIG. 2) to open. Ink flows from the ink bag 160 through the diaphragm valve 120 to the ink line 114, as described above. Ink 40 is drawn into the manifold 220 via the ink line 336. The ink 40 rises until the manifold is full because of the negative pressure applied to the diaphragm valve 120. Once the manifold is full of ink, the vacuum is turned off and the vacuum line 112 seals by using a valve (not shown).

The manifold remains sealed from the atmosphere to keep the pressure difference at an equilibrium. As ink 40 is used by the ink jets of the printbar 210, the ink is replaced via the ink line 336 due to the decreasing pressure within the manifold 220.

To replace the printbar 210, the handle is moved downward into the lower position shown in FIG. 6. Air line 332 is connected to top manifold connector line 352. Vacuum line 334 is connected to bottom manifold connector line 354. Ink line 336 is shut off by the O-ring 318 in contact with the teflon plate 322.

After the handle 310 is in position, the vacuum pump 110 is turned on to cause a vacuum in the bottom printbar manifold line 224. Air is drawn into the air line 332 to fill the top portion of the manifold 220. The ink 40 is drained from the manifold 220 via the bottom manifold connector line 354 and the vacuum line 334. The ink is stored in a spillage drain 139. Once the ink has been completely drained from the manifold, the thermal ink-jet printbar can be removed and replaced without spilling ink.

A second embodiment of the valving connector will be described with reference to FIGS. 7 and 8. Due to limited space in the printer, the valving connector 400 is positioned at an upward angle from the manifold 230. The manifold connections are angled to allow for a compact valving connector that restrains the valve travel to be above the printbar frame. In this position the valving connector 400 does not interfere with printing operations.

The valving connector 400 uses a manifold 230, which angles the top printbar manifold line 232 and bottom printbar manifold line 234. The valving connector uses a bracket 440 to connect the handle 410 to the base 420. The operation of the valving connector 400 is similar to the valving connector 300 and will be briefly described.

Figure 7:
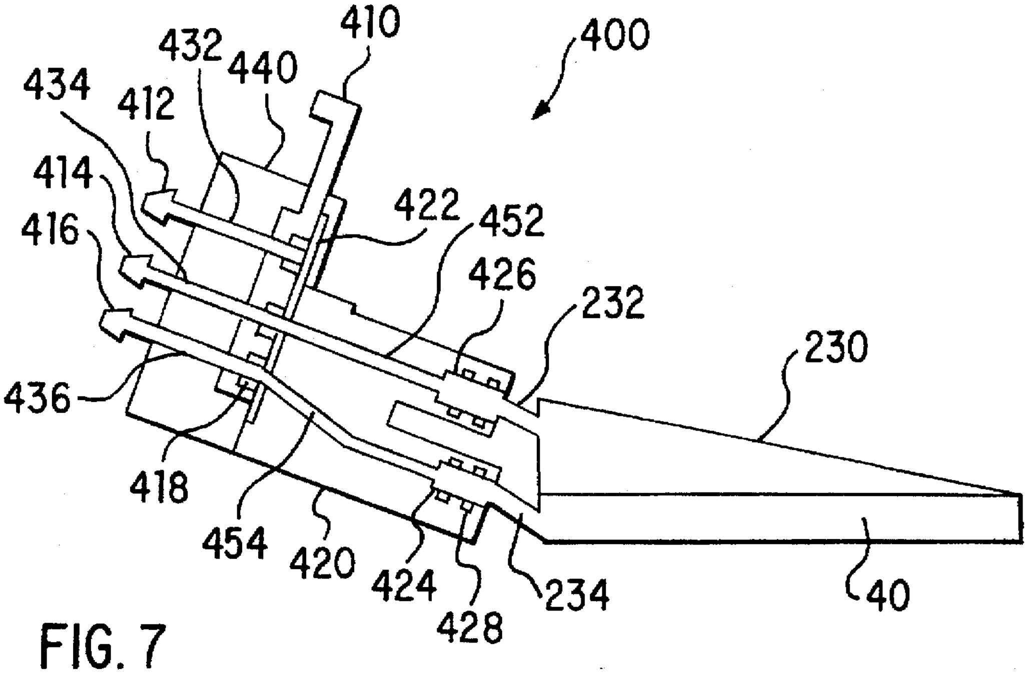
FIG. 7 is a detailed diagram of a second embodiment of a valving connector in a first position.

In FIG. 7, the handle 410 is in the up position. The vacuum is connected to the top printbar manifold line 232 via vacuum connector 414, vacuum line 434, top manifold connector line 452 and top output connector 426. The ink supply is connected to the bottom printbar manifold line 234 via ink connector 416, ink line 436, bottom manifold connector line 454 and bottom output connector 424. O-rings 428 tightly seal the connection between the valving connector 400 and the manifold 230.

When the vacuum is activated, a low pressure is generated in the top portion of the printbar manifold 230. Ink is drawn into the lower portion of the printbar manifold 230 until the ink 40 fills the manifold 230, similar to previous embodiment. The vacuum is turned off. The printbar is now operational.

Figure 8:
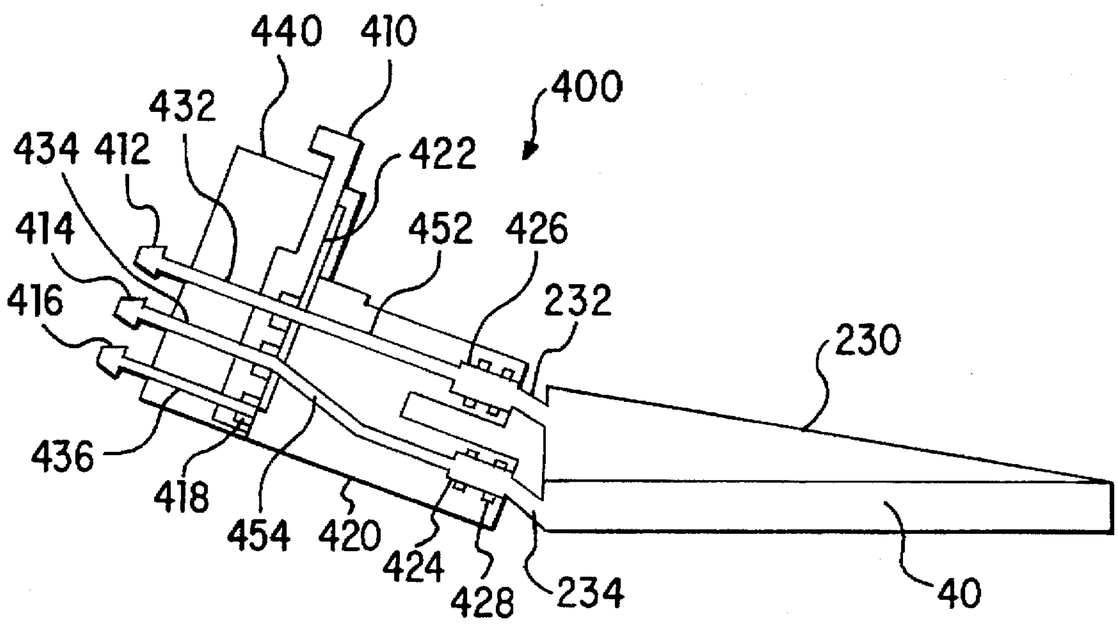
FIG. 8 is a detailed diagram of the second embodiment of a valving connector in a second position.

To replace the printbar 210, the handle is moved downward into the lower position shown in FIG. 8. Ink line 436 is shut off by the O-ring seal 418 in contact with the teflon plate 422. Air passes to top printbar manifold line 232 via air connector 412, air line 432, top manifold connector line 452 and top output connector 426. The vacuum is connected to the bottom printbar manifold line 234 via vacuum connector 414, vacuum line 434, bottom manifold connector line 454 and bottom output connector 424.

The vacuum pump 110 is activated to drain the ink from the manifold 230 via the bottom connector line 454. Air is drawn into the air line 432 to fill the top portion of the manifold 230. Once the ink has been completely drained from the manifold, the thermal ink-jet printbar can be removed and replaced without spilling ink.

Figure 9:
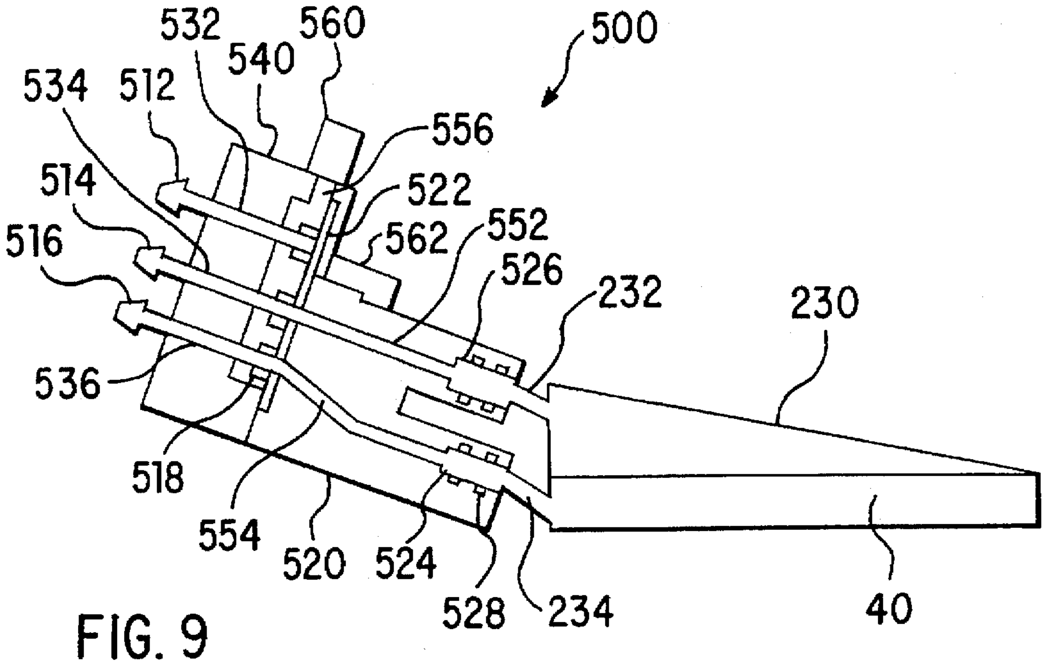
FIG. 9 is a detailed diagram of a third and fourth embodiments of a valving connector in a first position.
Figure 10:
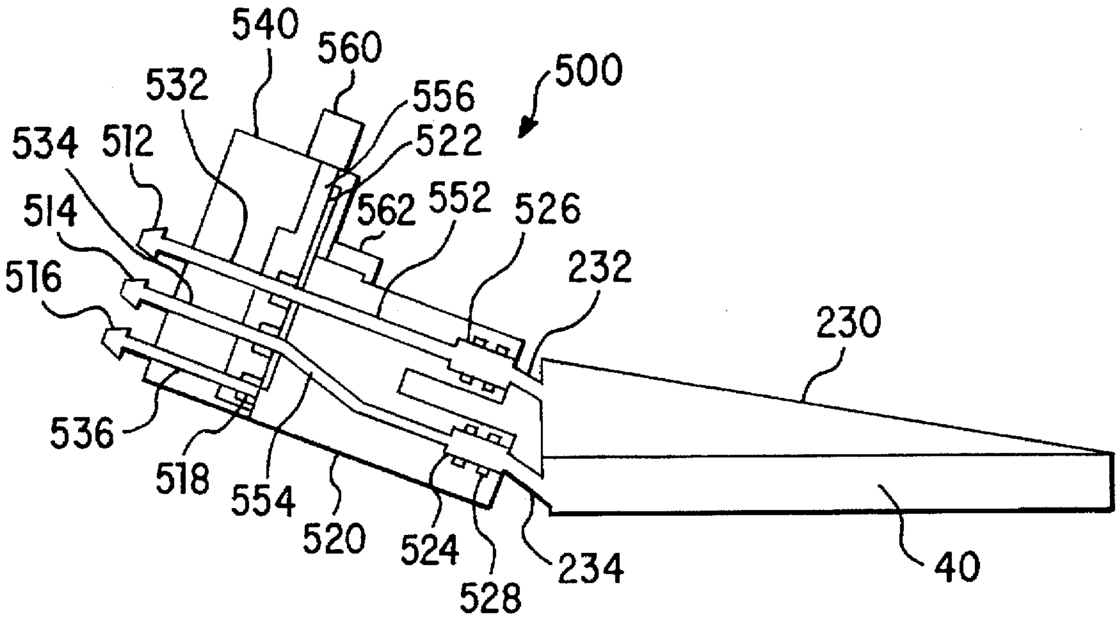
FIG. 10 is a detailed diagram of the third and fourth embodiments of a valving connector in a second position.

A third embodiment of the valving connector is shown in FIGS. 9 and 10. A solenoid 560 replaces the handle of the previous embodiments. Before removing the lid of the printer, the solenoid 560 can be activated by an external button or switch (not shown) on the printer. This eliminates the possibility of the technician not moving the handle into the correct position. The valving connector 500 uses a bracket 540 to connect the solenoid 560 to the slide 556 and the base 520. The operation of the valving connector 500 is similar to the previous embodiment and will be briefly described.

The solenoid 560 is activated to position the slide 556 as shown in FIG. 9. The vacuum is connected to the top printbar manifold line 232 via vacuum connector 514, vacuum line 534, top manifold connector line 552 and top output connector 526. The ink supply is connected to the bottom printbar manifold line 234 via ink connector 516, ink line 536, bottom manifold connector line 554 and bottom output connector 524. O-rings 528 tightly seal the connection between the valving connector 500 and the manifold 230.

When the vacuum is activated, a low pressure is generated in the top portion of the printbar manifold 230. Ink is drawn into the lower portion of the printbar manifold 230 until the ink 40 fills the manifold 230, similar to the previous embodiments. The vacuum is turned off. The printbar is now operational.

To replace the printbar 210, the solenoid 560 is activated to move the slide 556 to the lower position as shown in FIG. 10. Ink line 536 is shut off by the O-ring seal 518 in contact with the teflon plate 522. Air passes to top printbar manifold line 232 via air connector 512, air line 532, top manifold connector line 55; and top output connector 526. The vacuum is connected to the bottom printbar manifold line 234 via vacuum connector 514, vacuum line 534, bottom manifold connector line 554 and bottom output connector 524.

The vacuum pump 110 is activated to drain the ink from the manifold 230 via the bottom connector line 554. Air is drawn into the air line 532 to fill the top portion of the manifold 230. Once the ink has been completely drained from the manifold, the thermal ink-jet printbar can be removed and replaced without spilling ink.

A fourth embodiment of the valving connector will also be described with reference to FIGS. 9 and 10. A second solenoid 562 is attached to bracket 540 and the frame of the printer 10. Once the manifold 230 has been drained of ink, the second solenoid 562 is activated. The valving connector 500 is automatically separated from the manifold 230. The printbar is removed and a new printbar is positioned. The second solenoid 562 is again activated to automatically connect the valving connector 500 to the manifold 230 of the new printbar.

Although the invention has been described and illustrated with particularity, it is intended to be illustrative of preferred embodiments. It is understood that the disclosure has been made by way of example only. Numerous changes in the combination and arrangements of the parts, steps and features can be made by those skilled in the art without departing from the spirit and scope of the invention, as hereinafter claimed.

What is claimed is:

1. An ink handling system used in a thermal inkjet printer, comprising:

a container holding ink;

an ink connector connected to the container for removing the ink from the container without exposing the ink to atmosphere;

a removable printbar including inkjets;

a manifold holding ink in the removable printbar, the manifold supplying said ink to the inkjets of the removable printbar:

a regulator connected between the ink connector and the removable printbar, said regulator regulates a flow of the ink from the container to the removable printbar, and said regulator is a diaphragm valve comprising, a wall defining a cavity:

an entrance fitting connected between the ink connector and said cavity, the entrance fitting having an inside and containing a needle that seals against the inside of the entrance fitting;

an outlet connected to said cavity and coupled to the manifold to supply ink to the manifold from the cavity;

a metering plate disposed within the cavity;

a spring attached to the metering plate and to an interior surface of said wall, the spring applying tension against the metering plate;

a fulcrum disposed within said cavity;

a metering lever pivoting around said fulcrum, a first end of the metering lever attached to an end of the needle, and a second end of the metering lever being positioned between the spring and a first side of the metering plate; and a diaphragm located on an opposite second side of the metering plate for controlling movement of the metering lever, wherein a decreasing pressure within the cavity due to ink flowing out of the outlet causes the diaphragm to contract and the metering lever to pull the needle from the entrance fitting to allow ink to flow from the container into the cavity and an increasing pressure within the cavity caused by the ink eventually causes the metering plate to stretch the diaphragm causing the metering lever to push the needle into the entrance fitting to stop the flow ink; and vacuum means connected to the manifold for removing all of the ink from the manifold.

2. The ink handling system of claim 1, wherein the container is an ink bag, and at one end of the ink bag is a dispenser cap with a soft rubber septum.

3. The ink handling system of claim 2, wherein the soft rubber septum has a teflon layer having a low permeability.

4. The ink handling system of claim 1, wherein the ink in the container is degassed ink.

5. The ink handling system of claim 1, wherein the ink connector comprises:

a plastic column;

a needle located within the plastic column, the needle being hollow and having a side inlet near a tip of the needle;

a spring having a first end and a second end, the first end being attached to the plastic column;

a molded valve fitting inside the plastic column and sliding over the needle, the molded valve being connected to the second end of the spring such that the side inlet of the needle is covered by the molded valve when the spring is expanded and uncovered when the spring is compressed.

6. The ink handling system of claim 5, wherein the container has a dispenser cap with a soft rubber septum, and the needle of the ink connector has a round end to avoid coring of the soft rubber septum.

7. The ink handling system of claim 1 further comprising an air supply, wherein filtered air from said air supply is drawn into the manifold by the vacuum means.

8. An ink handling system used in a thermal inkjet printer, comprising:

a container holding ink;

an ink connector connected to the container for removing the ink from the container without exposing the ink to atmosphere;

a removable printbar including inkjets;

a regulator connected between the ink connector and the removable printbar, said regulator regulates a flow of the ink from the container to the removable printbar;

a manifold holding the ink in the removable printbar, the manifold supplying said ink to the inkjets of the removable printbar; and vacuum means connected to the manifold for removing all of the ink from the manifold, the vacuum means is connected to valving connector connected between regulator and the manifold, wherein the ink flows through the valving connector to the manifold during printing operations; and the vacuum means comprises a vacuum source for creating a vacuum that drains all of the ink from the manifold before the removable printbar is removed from the thermal inkjet printer;

the valving connector comprises:

a first output connector connected to a top aperture of the manifold, the top aperture being above a surface of the ink in the manifold during normal operating conditions of the printer;

a second output connector connected to a bottom aperture of the manifold, the bottom aperture being below the surface of the ink in the manifold during normal operating conditions of the printer;

a first input connector for inputting air;

a second input connector connected to the vacuum source;

a third input connector connected to the regulator; and connecting means for selectively connecting one of the first input connector, second input connector and third input connector to one of the first output connector and second output connector, a first position of the connecting means connecting the second input connector to the first output connector and the third input connector to the second output connector, and a second position of the connecting means connecting the first input connector to the first output connector and the second input connector to the second output connector.

9. The ink handling system of claim 8 further including a filter located between the regulator and the valving connector to filter the ink.

10. The ink handling system of claim 8, wherein the vacuum means comprises a vacuum pump and has a spillage drain to hold excess ink.

11. The ink handling system of claim 8, wherein the printbar is supplied ink for printing operations when the connecting means is in the first position, and the printbar is drained of ink when the connecting means is in the second position.

12. A method of replacing a printbar in a thermal ink-jet printer without spilling ink, the printbar having a manifold that holds ink during printing operations, and a valving connector connecting the manifold to an ink supply, an air supply and a vacuum source, the method comprising the steps of:

setting the valving connector in a first position wherein said air supply is connected to a top portion of the manifold and the vacuum source is connected to a bottom portion of the manifold;

generating a vacuum with the vacuum source to drain all of the ink from the manifold and to fill the manifold with air;

replacing the printbar by detaching the valving connector from the manifold of the printbar, replacing the printbar with a different printbar, and attaching the valving connector to a manifold of the different printbar;

setting the valving connector in a second position, wherein the vacuum source is connected to the top portion of the manifold and said ink supply is connected to the bottom portion of the manifold, the top portion of the manifold being above a surface of ink in the manifold and the bottom portion of the manifold being below the surface of ink in the manifold during printing operations; and generating a vacuum with the vacuum source to draw ink into the manifold until the surface of the ink is at a predetermined level.

13. The method of claim 12, further comprising a step of providing a solenoid to move the valving connector into the first position and the second position.

14. The method of claim 13, further comprising a step of activating the solenoid to cause the vacuum source to drain the ink from the manifold or fill the manifold with ink.

15. The method according to claim 13, further comprising a step of providing one of a button and a switch to activate the solenoid.

* * * * *